A. W. PERMENTO.
COTTER PIN ATTACHMENT.
APPLICATION FILED MAY 7, 1919. RENEWED JULY 6, 1921.

1,427,696. Patented Aug. 29, 1922.

INVENTOR
A. W. Permento
BY Strong & Townsend
ATTORNEYS

UNITED STATES PATENT OFFICE.

ANTHONY W. PERMENTO, OF SAN FRANCISCO, CALIFORNIA.

COTTER-PIN ATTACHMENT.

1,427,696. Specification of Letters Patent. Patented Aug. 29, 1922.

Application filed May 7, 1919, Serial No. 295,441. Renewed July 6, 1921. Serial No. 482,873.

*To all whom it may concern:*

Be it known that I, ANTHONY W. PERMENTO, a citizen of the United States, residing at the city and county of San Francisco and State of California, have invented new and useful Improvements in Cotter-Pin Attachments, of which the following is a specification.

This invention relates to means by which an increased frictional and locking contact is effected between the surfaces of the cotter pin and the hole in the bolt, nut, or other part to be secured, through which the pin is passed, to prevent the nut from jarring or otherwise becoming loosened or lost.

The customary way of securing ordinary cotter pins is to make them longer than the diameter of the bolt and nut, and, after the nut is in place, to expand or bend the projecting ends of the pin to engage the nut, so that the pin cannot be removed without being again straightened. It is troublesome to remove and use again and soon causes the pin to break and become useless.

In my invention the cotter pin may be very much shortened and such frictional surfaces or deformations are provided, that the pin will irremovably engage the bolt, or nut, without other action or preparation, and can be used again when released without preparation.

Having reference to the accompanying drawings.

A is a bolt, which may be of a suitable size for the work required. It may have a head B, at one end, and a castellated or other nut C, engageable with the screw threads upon the bolt, and adapted, when in place, to secure the required parts together.

A hole 2 is made transversely through the bolt outside the position of the nut, and through this hole a cotter pin 3 is passed, to prevent the nut from unscrewing or loosening. Special locking devices are employed to increase the engaging contact between the pin and the interior of the hole 2 and locking contact outside of the hole.

Figure 3:
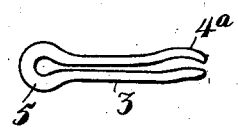
Figure 5:
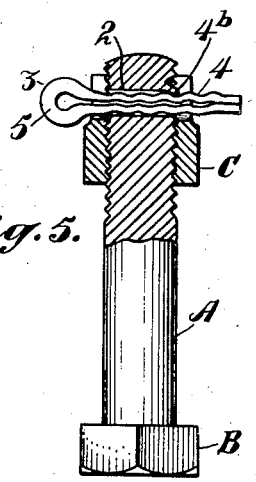
Figs. 5, 6 and 7 show the attachment of the pin to a bolt and nut.
Figure 6:
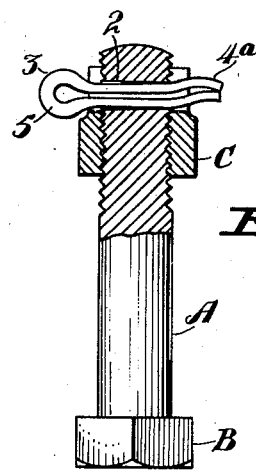
Figure 7:
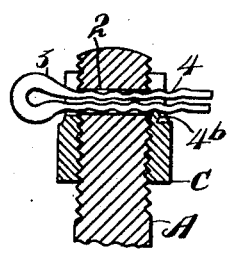

In the drawings, I have shown the pins having corrugated surfaces 4, which may extend through the hole in the bolt, or the exterior of the pin may be smooth where it passes through the hole, or a combination of plain and deformed surfaces, and one or both ends of the two legs of the pin may curve outwardly, as in Figs. 3 and 6, at $4^a$; the curvature being such that the ends of the legs may approach so that the pin will easily pass through the hole and will expand or separate after passing through so as to prevent its return. I have also found that the edges of the bolt hole may be indented so as to impinge against the cotter pin, as at $4^b$, and thus engage and lock the pin, or the nut, whether corrugated or plain, as shown in Figs. 5 and 7.

Figure 1:
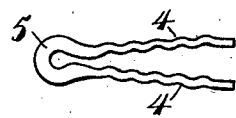
Figs. 1, 2, 3 and 4 illustrate different forms of cotter pins.
Figure 2:
Figure 4:

In Figs. 1, 2 and 4, I have shown the eye 5 of the cotter pin flattened or swaged so as to present a rectangular section through the two legs of the pin at this point, and the eye may also be expanded so that the legs will be separated and have an elastic action which will admit of their being compressed together to introduce the pin and separate when in position to cause the necessary binding effect. This is increased by the flattening of the eye which gives it a greater depth in the plane of the two legs of the pin at the eye, and thus increases its tension.

By this invention I am enabled to produce cotter pins which instantly and effectively engage to retain the parts in place without subsequent binding or other manipulation, which is a great saving of time, especially in automobile construction where such pins can be used in vast quantities.

While I have shown various forms by which I effect the locking of the parts, I do not wish to limit my invention, as other modifications may be employed to provide a locking contact between the parts without changing the character of the invention.

Having thus described my invention, what I claim and desire to secure by Letters Patent is:

1. In combination with a bolt having a hole therethrough and a nut on the bolt, a projection borne by one of said parts and intersecting the plane of said hole, and a cotter pin having similar concave and convex parts the inner convex parts of one leg of the pin being receivable in the inner concave parts of the other leg of the pin upon compressing the legs, said projection being formed to project into one of the outer concave parts of one of the legs of the pin upon expansion of the legs.

2. A cotter pin having similar concave and convex parts, extending substantially throughout the length of each leg of the pin respectively the inner convex parts of one leg of the pin being receivable in the inner concave parts of the other leg of the pin upon compressing the legs, whereby to give the effective parts of the legs a cross-sectional area to allow the same to be introduced into and through the hole formed to receive the pin by pressure of the fingers directly against the pin, the convex parts of the legs being formed to abut the respective opposite walls of the hole in which the pin is received.

3. A cotter pin constructed of substantially half round wire, the wire being bent upon itself to form a pair of leg portions which present their flat surfaces towards each other and an eye formed at the bite of the cotter legs, said eye being swaged on each side to form a pair of flat surfaces which are disposed substantially at right angles to the flat surfaces presented by the legs and the transverse distance between said flat surfaces being less than the flat surfaces presented by the legs.

4. A cotter pin having a swaged flattened eye portion, a pair of legs forming an extension thereof, said legs each having a series of bends formed along their longitudinal surfaces and the bends in one leg adapted to register and nest with relation to the bends in the other leg.

5. A cotter pin having similar interspaced registering bent portions extending substantially through each leg of the pin respectively, the bent portions of one leg adapted to nest in the bent portions of the other leg when the legs are pressed together to give the effective parts of the legs a cross sectional area to allow the same to be introduced into and through a hole formed to receive the pin and to permit the bent portions of each leg to abut the peripheral surface at the opposite end of the hole and frictionally secure the legs against removal when pressure is reduced.

In testimony whereof I have hereunto set my hand in the presence of two subscribing witnesses.

ANTHONY W. PERMENTO.

Witnesses:
W. W. HEALEY,
M. E. EWING.